(12) United States Patent
Torborg

(10) Patent No.: US 10,484,833 B1
(45) Date of Patent: Nov. 19, 2019

(54) METHODS, SYSTEMS AND COMPUTER READABLE MEDIA FOR PROVIDING AND USING ULTRA WIDEBAND LOCAL AREA NETWORKS (LANS)

(71) Applicant: Clairvoyant Networks, LLC, Austin, TX (US)

(72) Inventor: Tadd Christian Torborg, Raleigh, NC (US)

(73) Assignee: CLAIRVOYANT NETWORKS, LLC, Austin, TX (US)

( * ) Notice: Subject to any disclaimer, the term of this patent is extended or adjusted under 35 U.S.C. 154(b) by 0 days.

(21) Appl. No.: 16/383,301

(22) Filed: Apr. 12, 2019

(51) Int. Cl.
| | |
|---|---|
| H04W 4/029 | (2018.01) |
| H04B 1/7163 | (2011.01) |
| G01C 21/20 | (2006.01) |
| G01S 1/68 | (2006.01) |
| H04W 72/04 | (2009.01) |
| H04W 84/18 | (2009.01) |

(52) U.S. Cl.
CPC .......... *H04W 4/029* (2018.02); *G01C 21/206* (2013.01); *G01S 1/68* (2013.01); *H04B 1/7163* (2013.01); *H04W 72/0446* (2013.01); *H04W 84/18* (2013.01)

(58) Field of Classification Search
CPC ..... H04W 88/10; H04W 16/14; H04W 24/10; H04W 48/18; H04W 72/04; H04W 72/082; H04W 72/1215; H04W 76/20; H04W 84/045; H04W 92/02
See application file for complete search history.

(56) References Cited

U.S. PATENT DOCUMENTS

| | | |
|---|---|---|
| 6,829,534 B2 | 12/2004 | Fuchs et al. |
| 2003/0198212 A1 | 10/2003 | Hoctor et al. |
| 2005/0130669 A1 | 6/2005 | Mizugaki et al. |
| 2005/0237966 A1 | 10/2005 | Aiello et al. |
| 2005/0237981 A1 | 10/2005 | Aiello et al. |
| 2005/0271120 A1 | 12/2005 | Hoctor |
| 2006/0291537 A1 | 12/2006 | Fullerton et al. |

(Continued)

OTHER PUBLICATIONS

Non-Final Office Action for U.S. Appl. No. 16/270,560 (dated Apr. 18, 2019).

(Continued)

*Primary Examiner* — Liton Miah
(74) *Attorney, Agent, or Firm* — Jenkins, Wilson, Taylor & Hunt, P.A.

(57) ABSTRACT

Methods, systems, and computer readable media for providing and using ultra-wide-band (UWB) local area networks (LANs) are disclosed. A system for locating UWB devices includes UWB local area networks (LANs). Each UWB LAN includes anchors configured for performing UWB ranging and a LAN master anchor surrounded by at least some of the anchors. The LAN master anchor is configured for transmitting a UWB beacon to identify the UWB LAN to one or more candidate tags to join the UWB LAN. The system includes a tag securable to an object for tracking. The tag is configured for receiving a first UWB beacon from a first LAN master of a first UWB LAN; receiving a second UWB beacon from a second LAN master of a second UWB LAN; and determining to associate with the first UWB LAN based on the first UWB beacon and the second UWB beacon.

20 Claims, 6 Drawing Sheets

(56) References Cited

U.S. PATENT DOCUMENTS

| | | | |
|---|---|---|---|
| 2007/0081505 A1* | 4/2007 | Roberts | H04B 1/7163 370/338 |
| 2007/0139191 A1 | 6/2007 | Quatro | |
| 2008/0075153 A1 | 3/2008 | Roberts et al. | |
| 2008/0103696 A1 | 5/2008 | Cheok et al. | |
| 2008/0170559 A1 | 7/2008 | Zumsteg | |
| 2009/0055123 A1 | 2/2009 | Razzell | |
| 2009/0231136 A1 | 9/2009 | Sugla et al. | |
| 2010/0239065 A1* | 9/2010 | Tsubota | A61B 6/00 378/62 |
| 2010/0266003 A1 | 10/2010 | Patino-Studencka et al. | |
| 2010/0277286 A1 | 11/2010 | Burkart et al. | |
| 2010/0322208 A1 | 12/2010 | Tsudaka | |
| 2011/0051847 A1 | 3/2011 | Flury et al. | |
| 2011/0092223 A1 | 4/2011 | Nakagawa et al. | |
| 2011/0140970 A1 | 6/2011 | Fukagawa et al. | |
| 2011/0274141 A1 | 11/2011 | Jantunen et al. | |
| 2013/0051507 A1 | 2/2013 | Jantunen et al. | |
| 2013/0066448 A1* | 3/2013 | Alonso | H04Q 9/00 700/91 |
| 2013/0154836 A1 | 6/2013 | Derrico et al. | |
| 2014/0210660 A1 | 7/2014 | Larose et al. | |
| 2014/0253388 A1 | 9/2014 | Jalali et al. | |
| 2014/0304351 A1 | 10/2014 | Davis | |
| 2014/0315582 A1 | 10/2014 | Dong et al. | |
| 2015/0087331 A1 | 3/2015 | Yang et al. | |
| 2015/0200706 A1 | 7/2015 | Bottazzi et al. | |
| 2016/0044626 A1 | 2/2016 | Li et al. | |
| 2016/0357193 A1 | 12/2016 | Bruemmer et al. | |
| 2017/0026807 A1* | 1/2017 | Gherardi | H04W 4/021 |
| 2017/0131383 A1 | 5/2017 | Bartov et al. | |
| 2017/0244444 A1 | 8/2017 | Bruemmer et al. | |
| 2017/0261592 A1 | 9/2017 | Min et al. | |
| 2017/0336493 A1 | 11/2017 | Gross | |
| 2018/0045807 A1 | 2/2018 | Senna et al. | |
| 2018/0059231 A1 | 3/2018 | Dewberry et al. | |
| 2018/0067191 A1 | 3/2018 | Hamilton | |
| 2018/0133580 A1 | 5/2018 | DeAngelis et al. | |
| 2018/0213492 A1 | 7/2018 | Xia | |
| 2018/0254925 A1 | 9/2018 | Dutz et al. | |
| 2018/0272221 A1 | 9/2018 | Sundararajan et al. | |
| 2019/0104493 A1 | 4/2019 | Hedley et al. | |

OTHER PUBLICATIONS

Commonly-assigned, co-pending U.S. Appl. No. 16/294,674 for "Methods, Systems, and Computer Readable Media for Distribution of Time Synchronization Information to Ultra-Wide-Band Devices," (Unpublished, filed Mar. 6, 2019).

Commonly-assigned, co-pending U.S. Appl. No. 16/270,560 for "Methods, Systems, and Computer Readable Media for Time-Slotted Ultra-Wide-Band Object Tracking," (Unpublished, filed Feb. 7, 2019).

"Location Finds Bluetooth, Ultra-Wideband," Slashdot, https://mobile.slashdot.org/story/19/01/28/1630225/location-finds-bluetooth-ultra-wideband?utm_source=rss1.0mainlinkanon&utm_medium=feed, pp. 1-8 (Jan. 28, 2019).

Merritt, "Location Finds Bluetooth, UWB," EE Times, https://www.eetimes.com/document.asp?doc_id=1334243#, pp. 1-3 (Jan. 28, 2019).

"DW1000 Datasheet," Decawave IEEE802.15.4-2011 UWB Transceiver, Version 2.18, pp. 1-49 (2017).

"DW1000 User Manual," Decawave Ltd., Version 2.17, pp. 1-247 (2017).

"EVK1000 User Manual," Decawave Ltd., Version 1.13, pp. 1-30 (2016).

"TREK1000 User Manual," Decawave Ltd., Version 1.08, pp. 1-54 (2016).

"APS013 Application Note: The implementation of two-way ranging with the DW1000," Decaware, Version 2.3, pp. 1-15 (2015).

"APS016 Application Note: Move from Trek1000 to a product," Decaware, Version 2.3, pp. 1-24 (2015).

Gaffney, "Considerations and Challenges in Real Time Locating Systems Design," Decawave Ltd, White Papers, pp. 1-5 (Jun. 1, 2015).

McElroy et al., "Comparision of wireless clock synchronization algorithms for indoor location systems," International Conference on Communications, pp. 1-7 (Jun. 2014).

Yavari et al., "Ultra Wideband Wireless Positioning Systems," Technical Report TR14-230, pp. 1-51 (Mar. 27, 2014).

Applicant-Initiated Interview Summary for U.S. Appl. No. 16/270,560 (dated Jul. 18, 2019).

Non-Final Office Action for U.S. Appl. No. 16/294,674 (dated Jun. 14, 2019).

Notice of Allowance and Fee(s) Due for U.S. Appl. No. 16/270,560 (Aug. 1, 2019).

* cited by examiner

METHODS, SYSTEMS AND COMPUTER READABLE MEDIA FOR PROVIDING AND USING ULTRA WIDEBAND LOCAL AREA NETWORKS (LANS)

TECHNICAL FIELD

The subject matter described herein relates to ultra-wideband communications. More particularly, the subject matter described herein relates to methods, systems, and computer readable media for providing and using ultra-wide-band (UWB) local area networks (LANs).

BACKGROUND

Many systems make use of signal strength to guess at how far away a calibrated (transmit signal level) sender is located. Being able to accurately measure the actual distance between devices would be valuable but, until recently, no practical scheme existed which could perform that function with useful precision in small areas.

RADAR (Radio Detection and Ranging) has been used since World War II to measure distance, counting the time between radio transmission of a pulse and reception of the echo (radio time-of-flight). RADAR uses a high-powered radio signal with enough energy that the signal reflected by a passive metal object at a distance still had enough energy to be received back at the RADAR transceiver. Because of the distances involved, thousands of feet to miles, the precision of the timers used in RADAR didn't have to be very good. The speed of a radio message is about 5.4 microseconds per mile. A RADAR set with a one-megahertz counter would count about 5.4 ticks per mile. RADAR only worked in long distances and with very poor precision compared to the size of an indoor stage.

Some modern aircraft tracking systems use a scheme with an active transmitter called a transponder. The transponder notices the RADAR radio signal pulse and immediately transmits a complex radio message containing useful information about the aircraft. This supplemental information could even include the latitude and longitude of the aircraft, measured using global positioning system (GPS) equipment, giving redundant information back to the aircraft tracking network.

The challenge of tracking equipment inside a building isn't solved by RADAR or GPS. RADAR is too high energy and GPS is dependent on radio line-of-site with orbiting satellites. However, the transponder mechanism would be useful, if the time-delay between radio signal pulse and transponder response was knowable, and if the time-of-flight could be measured with much greater precision than 70-year-old RADAR technology.

In the ensuing 70 years, radio devices have become smaller and more sophisticated. We can now purchase integrated circuit (IC) radios which cost as little as $1 and which are far more sensitive than the old equipment, and which deliver digital data and receive signal strength. These radio IC chips have been used by tracking systems to provide location resolution with several meter precision. Time-of-flight measurement was still not practical until very recently.

Accordingly, in light of these difficulties associated with conventional solutions, there exists a need for methods, systems, and computer readable media for providing and using ultra-wide-band (UWB) local area networks (LANs).

SUMMARY

According to one aspect, a system for locating ultra-wideband (UWB) devices includes UWB local area networks (LANs), including at least a first UWB LAN and a second UWB LAN. Each UWB LAN includes anchors configured for performing UWB ranging and a LAN master anchor surrounded by at least some of the anchors. The LAN master anchor is configured for transmitting a UWB beacon to identify the UWB LAN to one or more candidate tags to join the UWB LAN. The system includes a tag securable to an object for tracking. The tag is configured for receiving a first UWB beacon from a first LAN master of the first UWB LAN; receiving a second UWB beacon from a second LAN master of the second UWB LAN; and determining to associate with the first UWB LAN based on the first UWB beacon and the second UWB beacon.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by a processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

This specification describes methods, systems, and computer readable media for time-slotted ultra-wide-band (UWB) object tracking. The methods, systems, and computer readable media can be used, for example, to establish the location of mobile assets inside a facility (e.g., one or more buildings) and relay that information to a remote computer system such as a cloud service.

The systems described in this specification can be used, for example, to generate a range from each of several fixed stations, called "anchors," to each of many mobile stations, called "tags." The location information can be delivered to, for example, an Internet-connected gateway device. In some examples, anchors are power-rich (e.g., alternating current (AC) powered from a wall socket) but do not have wired network connections. Tags may be power-rich but can be configured to accommodate battery power.

The deployment of anchors and tags in a facility could include large numbers of anchors and tags, e.g., hundreds of anchors and hundreds of tags. In some examples, each tag's proximity to several anchors is measured frequently, for example, between every two and every 60 seconds.

In some examples, only some parts of the facility will be populated with anchors, so tag location might not be available from all locations within the facility. However, the system can be configured to report that a tag was recently detected in the facility. The rate of that reporting, and the rate of tag precision locating can be adjustable with consideration of factors such as battery life and tag density.

Figure 1:
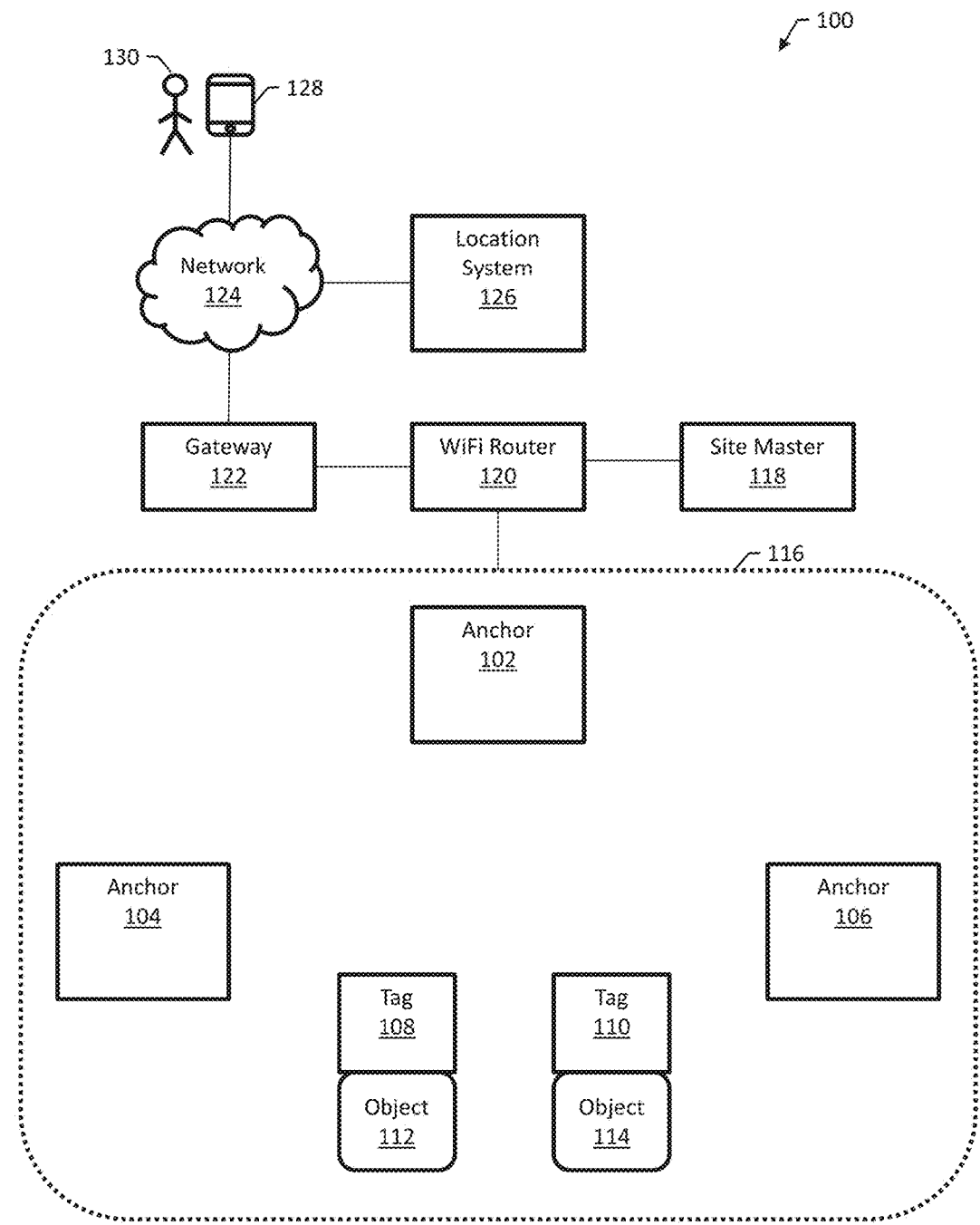
FIG. 1 is a block diagram of an example system for UWB object tracking.

FIG. 1 is a block diagram of an example system 100 for UWB object tracking. System 100 includes at least three anchors 102, 104, and 106. Each of anchors 102, 104, and 106 can include at least one processor, a UWB radio, and a timing system.

System 100 includes several tags each secured to an object for tracking. For purposes of illustration, FIG. 1 shows two tags 108 and 110 secured to two objects 112 and 114. Each of tags 108 and 110 can include at least one processor, a UWB radio, and a timing system. The tag timing systems are synchronized to the anchor timing systems. Taken together, anchors 102, 104, and 106 and tags 108 and 110 form an UWB local area network (LAN) 116.

In operation, anchors 102, 104, and 106 and tags 108 and 110 perform time-slotted UWB ranging. For example, anchors 102, 104, and 106 can perform time-slotted UWB ranging during designated time windows, one for each tag. In each time window, anchors 102, 104, and 106 sequentially transmit UWB transmissions in designated time slots of the time window, one time slot for each anchor, as specified by an order of operation. The tag assigned to the time window receives the UWB transmissions and responds to each transmission by sending a responsive UWB transmission. Anchors 102, 104, and 106 receive the responsive UWB transmissions and determine time-of-flight measurements for the responsive UWB transmissions. Then, each anchor of anchors 102, 104, and 106 determines a distance between the anchor and the tag assigned to the time window based on the time-of-flight measurements.

System 100 can include a site master 118. Site master 118 is a computer system configured for synchronizing the tag timing systems and the anchor timing systems. Site master 118 can communicate with the LAN 116, e.g., by way of a WiFi router 120.

System 100 can include a gateway 122. Gateway 122 is a computer system configured for communicating with a data communications network 124, such as the Internet, to communicate with a location system 126. Location system 126 is a computer system configured for receiving ranging information from anchors 102, 104, and 106 and determining tag locations. Location system 126 can also be configured for assigning tags to time windows, designating time slots within the time windows, and for specifying an order of operation for anchors to transmit in the time slots within the time windows.

Although system 100 is depicted as having site master 118, in some examples, another appropriate system can act as a time source for system 100. For example, gateway 122 can be configured to act as a time source, or another device on the WiFi network could be configured to act as a time source. In some examples, one of anchors 102, 104, and 106 can be configured to act as a time source, e.g., by the WiFi network or some other appropriate radio (or wired) network. For example, an anchor acting as a time source can provide a source time via UWB network 116.

System 100 can include a user device 128, e.g., a user computer or mobile phone or tablet. A user 130 can use the user device 128 to determine the location of the objects 112 and 114. For example, anchors 102, 104, and 106 can transmit ranging information for tags 108 and 110 to location system 126 by way of gateway 122, and location system 126 can receive and respond to location requests from user device 128.

In some examples, location system 126 maintains data associating tag identifiers with object identifiers and assigned time windows. For example, when user 130 secures tag 108 to object 112, a tag identifier for tag 108 can be associated with an object identifier for object 112 in a database stored at location system 126. Location system 126 can then associate the assigned time window for tag 108 with the tag identifier and the object identifier. When user 130 requests the location of object 112, user 130 can supply the object identifier in a request message. Location system 126 can look up the tag identifier and the assigned time window for the tag identifier. Location system 126 can then respond with the tag location based on the ranging message exchange during the assigned time window for the tag identifier.

In general, anchors 102, 104, and 106 report ranging distances to location system 126 (or another appropriate computer system), for example, by transmitting ranging distances to gateway 122 by way of Wi-Fi router 120, and location system 126 determines tag locations based on the reported ranging distances from the anchors.

In some examples, the tags can be used to track mobile phones. For example, some mobile phones may have embedded UWB radios that can be used as the tags shown in FIG. 1. Suppose that object 112 is a mobile phone and that tag 108 is implemented on the processor of the mobile phone and an embedded UWB radio of the mobile phone. Then, the mobile phone can, for example, register with site master 118 and the location of the mobile phone can be tracked using tag 108.

If a population of anchors includes a distribution across a large facility, and if the ranging results should be delivered rapidly and often, it can be useful to configure system 100 to use the most relevant anchors to perform ranging with a tag. Ideally the tag will be tracked only by 3 Anchors which fully surround the tag, and at 120-degree angles from one another, from the tag's perspective. In practice, the tag location tracking will be adequate if it is in range of 3 anchors where the angle between anchors is wider than, e.g., 20 degrees or so.

In some examples, the anchors are located on walls, e.g., so the staff doesn't trip over them. Since the tag is mobile, it is unlikely that the anchors will be in the ideal positions relative to the tag. Instead, system 100 can be configured to use more than 3 anchors in any ranging attempt, and system 100 can select those anchors to be relative to where the tag is located. Then, system 100 can appropriately weight the ranging responses based on the actual angles presented at the time of calculation.

FIGS. 2A-2D depict example systems that include multiple UWB LANs to illustrate the process of identifying which anchors to use to locate a tag. In general, the process includes creating sets of anchors, e.g., sets of up to 16 anchors, as UWB LANs, and then associating the tag with one of the sets so that set of anchors may perform ranging with the tag. A centralized system, e.g., a site master, is configured for maintaining the assignment of all the anchors and UWB LANS and sending configuration information to the anchors. The tag associates with one UWB LANs on-the-fly.

In general, a UWB LAN is a set of anchors that includes a LAN master anchor which is surrounded by at least some of the anchors. The LAN master anchor is configured transmitting a UWB beacon to identify the UWB LAN to one or more candidate tags to join the UWB LAN. The tags are configured for determining to associate with one of the UWB LANs based on received beacons.

For example, in some systems, a UWB LAN includes:
a set of up to 16 anchors
where one anchor is designated LAN master.
The LAN master is more-or-less in the physical middle of the set; and
the other anchors surround the LAN master such that the furthest are at a distance which is slightly further than the anchor to tag UWB range, but still within the anchor to anchor UWB range.
The tag is in range of the LAN if it the tag is in UWB range of the LAN master for that UWB LAN.
The facility could have many sets of up to 16 anchors, with an individual anchor participating in up to several different overlapping UWB LANs.

The LAN master, being near the center of each UWB LAN, is relevant to the tag's selection of a UWB LAN because if the tag is in range of the LAN master, the tag is, by design, very likely to be within range of at least 2 other anchors which surround the LAN master. This spacing and signaling range can be one of the system requirements.

The tag is configured to identify, for itself, which LAN is most appropriate to support the tag. This is performed by having the LAN masters send out a beacon (typically a UWB message) at a known time (scheduled by a centralized device, e.g., the location system 126 of FIG. 1), and to have the tag listen for the beacon to each of the LAN masters. The tag will choose which UWB LAN it will associate with based on, e.g., the beacon strengths or other information present in the beacon messages or both. If the tag remains in range of the last LAN master whose LAN's ranging it last participated in, it will remain associated with that UWB LAN. If it is no longer within range of the prior UWB LAN, it will re-associate (using UWB messages) with a new UWB LAN.

Figure 2A:
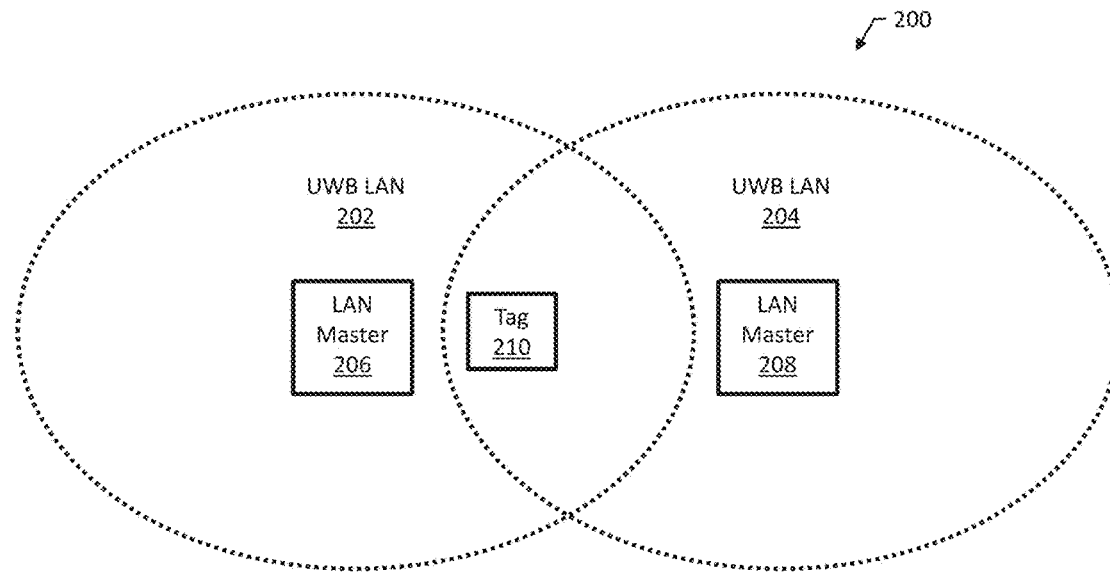
FIGS. 2A-2D depict example systems that include multiple UWB LANs.

FIG. 2A is a block diagram of an example system 200 that includes a first UWB LAN 202 and a second UWB LAN 204. UWB LAN 202 includes a LAN master anchor 206 which is surrounded by at least some of the anchors of UWB LAN 202. UWB LAN 204 also includes a LAN master anchor 208 which is surrounded by at least some of the anchors UWB LAN 204. System 200 also includes a tag 210.

As shown in FIG. 2A, tag 210 is within range of both UWB LAN 202 and UWB LAN 204. Tag 210 will receive a beacon from both LAN master 206 and LAN master 208. Tag 210, however, is physically closed to LAN master 206 than it is to LAN master 208. Based on the received beacons, tag 210 will determine to associate with UWB LAN 202. For example, tag 210 can use its UWB ranging capabilities to calculate a distance to each of LAN master 206 and LAN master 208 and select LAN master 206 as a result of the distance to LAN master 206 being smaller than the distance to LAN master 208.

In some examples, a beacon includes information specifying an available capacity of the LAN master transmitting the beacon, and tags can be configured to used the available capacity in selecting LANs. For example, a tag could determine to associate with a LAN having a greater capacity even if another LAN is closer in distance. In some examples, a beacon includes a list of tag identifiers for tags associated with the LAN.

Figure 2B:
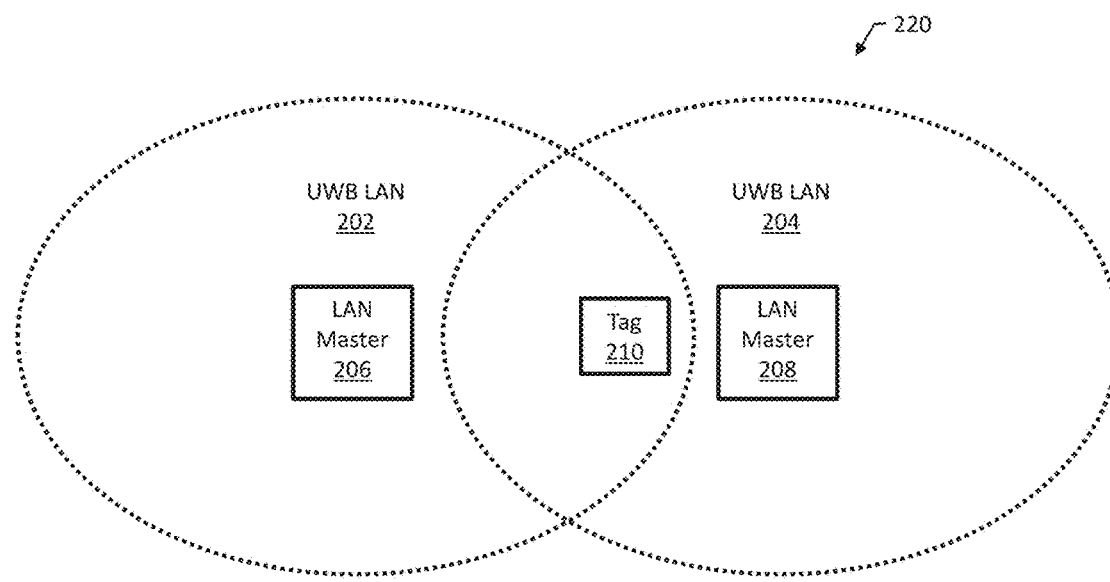

FIG. 2B is a block diagram of an example system 220 where tag 210 has moved such that it is closer to LAN master 208. Tag 210 will receive a beacon from both LAN master 206 and LAN master 208. Based on the received beacons, tag 210 may determine to associate with UWB LAN 204 instead of UWB LAN 202. In some examples, tag 210 is configured to remain associated with an existing LAN until the existing LAN association deteriorates (e.g., the LAN master is so far away that ranging is not possible) or another LAN is significantly better (e.g., has a greater capacity or is closer in distance or both).

Figure 2C:
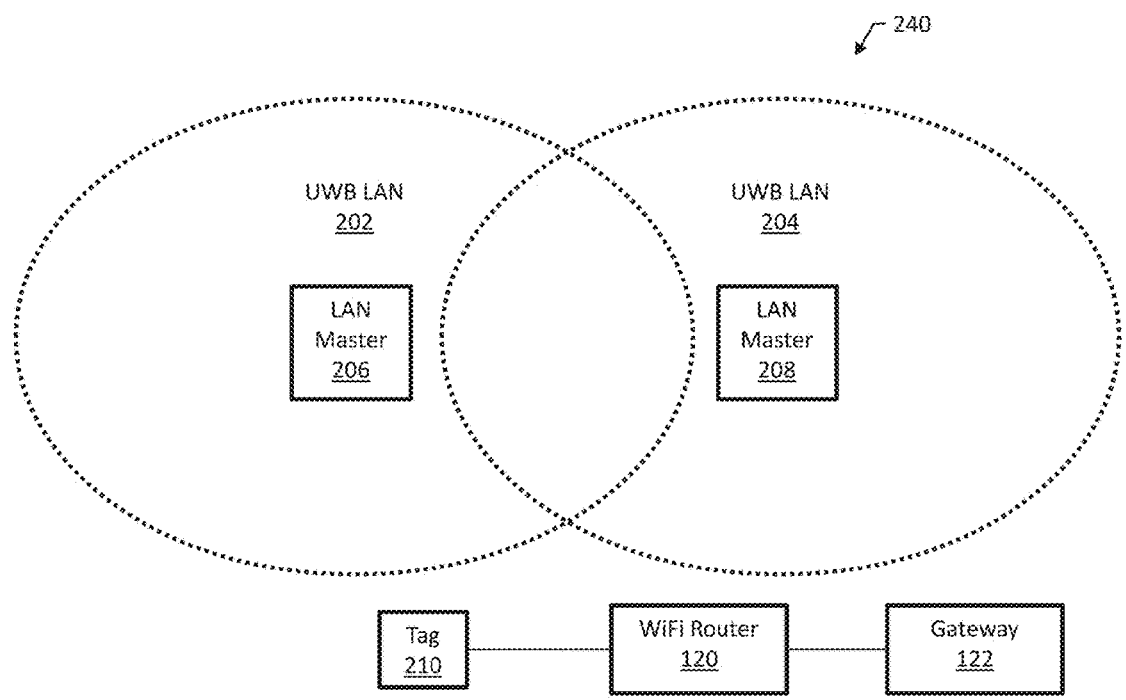

FIG. 2C is a block diagram of an example system 240 where tag 210 has moved out of range of both UWB LAN 202 and UWB LAN 204. If tag 210 does not hear a beacon from any LAN master, tag 210 will not be able to associate with a UWB LAN. Tag 210 may fail to be tracked.

However, in some examples, the entire facility, while not necessarily blanketed by UWB coverage, is fully covered by the WiFi network (or is better covered by the WiFi network than by UWB coverage). After a configured timeout, tag 210 will turn on its WiFi radio and associate with the WiFi network. Once associated, tag 210 calls a centralized system available on the WiFi network, e.g., a gateway, a site master, or another appropriate system. As shown in FIG. 2C, tag 210 calls the gateway 122 of FIG. 1 over the WiFi Router 120 of FIG. 1.

Once contact is made, tag 210 will use the WiFi network to send its last known UWB LAN association (e.g., by sending a UWB LAN identifier provided by a LAN master). In some examples, tag 210 sends operational statistics and any useful sensor data, possibly including barometric data, and inertial navigational information, depending on the capabilities and configuration of tag 210.

Gateway 122 or another system can provide, e.g., time synchronization information and instructions to tag 210. The instructions can be, e.g., to perform some function or to let tag 210 perform a default behavior. The default behavior can be to use the time synchronization information to listen for LAN master beacons. After some preset-number of cycles, failing to hear a LAN master beacon, tag 210 will time-out again and once-again call site master 118 via the WiFi network. This sequence of timing-out of listening to UWB and reverting to WiFi can change dynamically to preserve the battery of tag 210.

In some examples, if an anchor or tag can't find the configured WIFI network, it is configured to search out an alternate network whose SSID and security-code is pre-programmed into the anchors and tags at production time. This preprogrammed network exists in a test fixture, e.g., in a factory, or would be locally operated in a portable fixture that deployment staff can carry around the facility. On finding the alternate factory-network, the device is configured to fetch a configuration page and get the assignment of the customer network. IN this manner, the system can configure newly installed equipment with the on-site facility network. The system can also use this process to factory or field upgrade the built-in firmware of the devices.

Figure 2D:
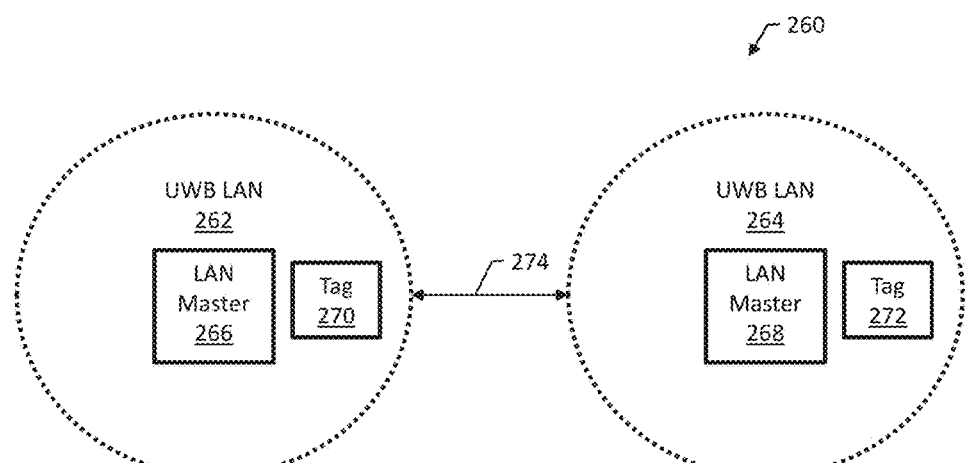

FIG. 2D is a block diagram of an example system 260 where two UWB LANs are non-overlapping, which allows the re-usage of time slots in performing time-slotted UWB ranging.

System 260, using the time synchronization between UWB devices, uses a small window of time (e.g., once every several seconds) to perform UWB ranging with tags and anchors of a single UWB LAN. System 260 enables multiple non-overlapping time-windows, enabling multiple LANs to do ranging in the same several second period. Each anchor may be a member of any non-overlapping time-windows in physically overlapping LANs (e.g., UWB LAN 202 and UWB LAN 204 in FIG. 2A).

System 260 allows for more UWB LANs than there are time-windows. The physical LAN is physically separated from each other same-time-window LAN by virtue of being at least a threshold distance away from each other same-time-window LAN.

When a tag listens for the LAN master beacons, the tag will either get a clear copy of one LAN master beacon, or will hear no LAN master. If two LAN masters are close to the tag but in the same time-window, the tag will not get a clear copy. The system is configured such that the tag will associate with a UWB LAN where the tag gets a clear copy of the beacon from the LAN master. If more than one LAN master beacon is received (in different time-windows), the tag can determine which UWB LAN to associate with based on the received beacons. In some examples, the UWB LANs will be deployed to overlap with each other, such that anchors wills serve in more than one LAN, and those overlapping LANs will necessarily be on separate time-windows.

As shown in FIG. 2D, system 260 includes a first UWB LAN 262 and a second UWB LAN 264 that is non-overlapping with the first UWB LAN 262. A distance 274 between UWB LAN 264 and UWB LAN 262 ensures that no tag will hear UWB ranging messages from both UWB LAN 262 and UWB LAN 264. The threshold distance to ensure non-overlapping UWB transmissions can be based on, e.g., the signal strengths of the UWB transmissions and the presence or absence of physical barriers such as walls.

UWB LAN 262 includes a LAN master 266 that can send a beacon in a same time slot as the LAN master 268 of UWB LAN 264. Moreover, anchors of UWB LAN 262 can perform time-slotted UWB ranging on a tag 270 in the same time slots that anchors of UWB LAN 264 can perform time-slotted UWB ranging on tag 272 that is at a distance from tag 270.

Figure 3:
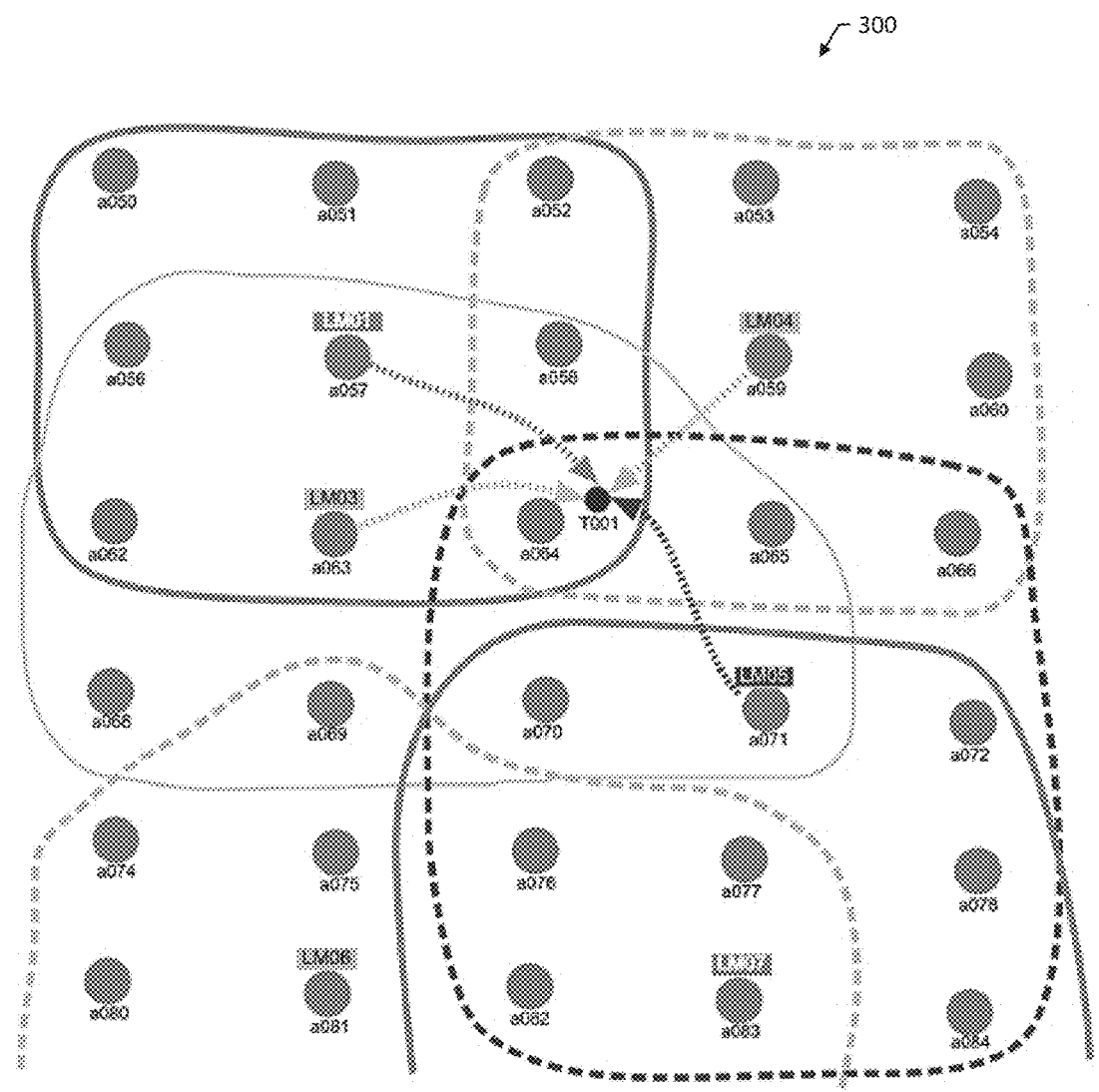
FIG. 3 is a diagram of an example system including several UWB LANS, some of which are overlapping and some of which are not.

FIG. 3 is a diagram of an example system 300 including several UWB LANS, some of which are overlapping and some of which are not. Overlapping UWB LANs are configured such that transmissions are time-slotted to not overlap. Non-overlapping UWB LANS can share time slots.

For example, consider tag T001. Tag T001 receives LAN master beacons from four different LAN masters, LM01, LM03, LM04, and LM05. Each of those LAN masters is configured to transmit its beacon in a unique time slot. Tag T001 will determine which UWB LAN to associate with based on the beacons.

As shown in FIG. 3, system 300 includes six different UWB LANs; however, only four different time windows are needed to perform UWB ranging. For example, the UWB LAN surrounding LM01 and the UWB LAN surrounding LM08 can share a time window. Similarly, the UWB LAN surrounding LM04 and the UWB LAN surrounding LM06 can share a time window.

Anchors can be in more than one UWB LAN but they can only be in each time window once. For example, consider anchor a065. Anchor a065 is in the UWB LAN surrounding LM03, the UWB LAN surrounding LM04, and the UWB LAN surround LM05. There is at least one LAN master in each UWB LAN and it is in range of every anchor in its UWB LAN.

Figure 4A:
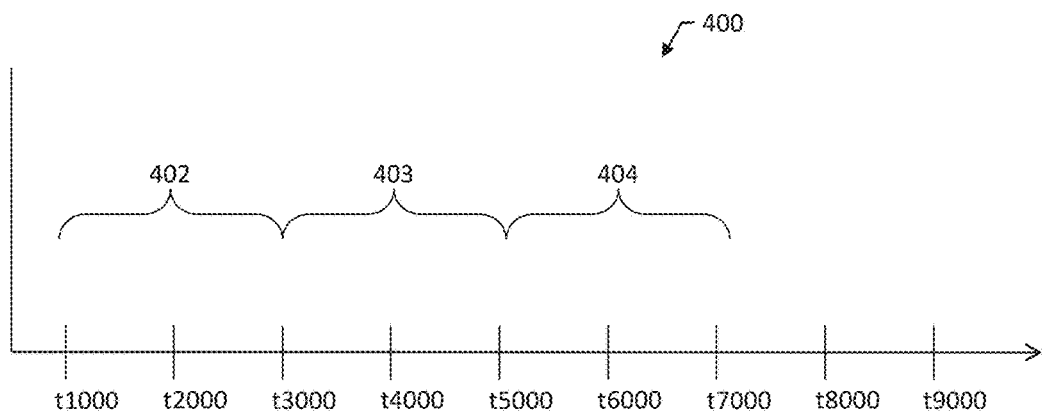
FIG. 4A is a timeline illustrating example repeating epochs.

FIG. 4A is a timeline 400 illustrating example repeating epochs of the system 100 of FIG. 1. FIG. 4A shows three epochs 402, 403, and 404. Each epoch is a time interval in which all system behaviors take place once. In each epoch, anchors 102, 104, and 106 complete message exchanges for, e.g., distributing time synchronization, performing UWB ranging on tags, and transmitting LAN master beacons and responsive tag messages to associate with UWB LANs.

An epoch has a suitable duration for all system behaviors to take place once, e.g., two seconds. For example, an epoch can include six time windows, and up to six tags can be assigned to the six time windows. A time window can include enough time for, e.g., 300 ranging exchanges.

Figure 4B:
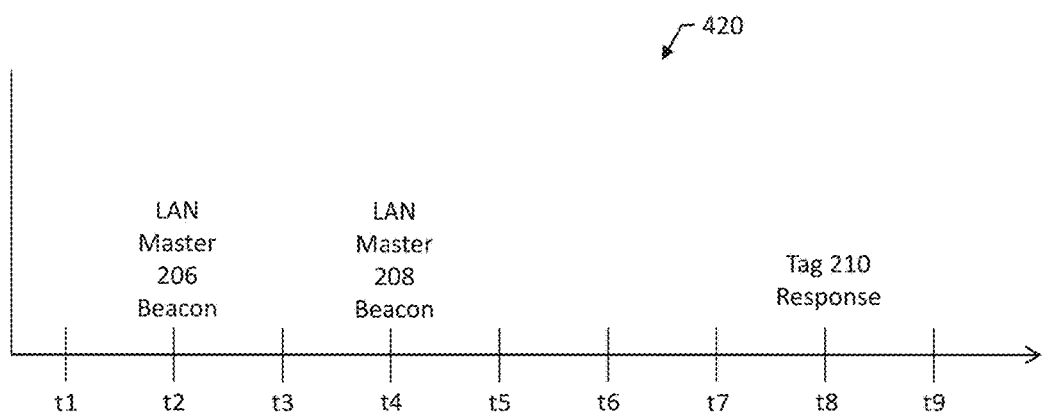
FIG. 4B is a timeline illustrating example assigned time slots for LAN master anchors of overlapping UWB LANS to transmit beacons.

FIG. 4B is a timeline 420 illustrating example assigned time slots for LAN master anchors of overlapping UWB LANS to transmit beacons for the system 200 of FIG. 2A. LAN master 206 is assigned to transmit its beacon at time t2, and LAN master 208 is assigned to transmit its beacon at time t4. Tag 210 is configured to listen at times t2 and t4, and tag 210 is assigned to transmit its join message at time t8, which allows time for each LAN master to transmit its beacon and for tag 210 to determine which UWB LAN to associate with based on the beacons.

In general, the tags are configured to only transmit a join message to a LAN master when changing LANs. Once a tag is recognized by a LAN master as being associated with a LAN, the tag will not send further join messages to the LAN master until, e.g., it goes out of range of the LAN, or it determines that a newly available LAN is an improvement, or the LAN master sends a message (e.g., a beacon) that does not include the tag. Then the tag will try to join a LAN by sending a join message.

Figure 5:
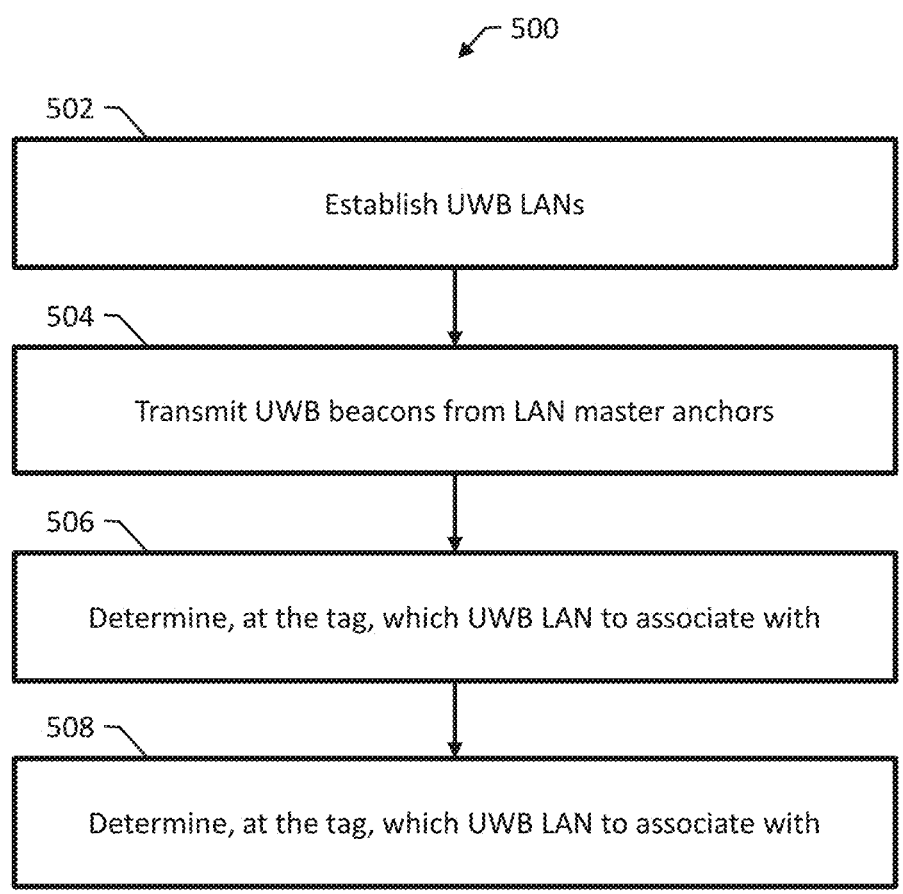
FIG. 5 is a flow diagram of an example method for locating UWB devices.

FIG. 5 is a flow diagram of an example method 500 for locating UWB devices. Method 500 can be performed by the system 100 of FIG. 1.

Method 500 includes establishing UWB LANs, including at least a first UWB LAN and a second UWB LAN (502). Establishing the UWB LANs can include initializing the anchors and tags. Initializing the anchors and tags can include, e.g., assigning anchors designated time slots to perform UWB ranging, and assigning time slots to anchors for distributing time synchronization information.

Method 500 includes transmitting, from each LAN master of the UWB LANs, a beacon to identify the UWB LAN to one or more candidate tags to join the UWB LAN (504). Method 500 includes determining, at a tag, which of the UWB LANs to join based on the received beacons from the LAN master (506). Method 500 includes associating, at the tag, with a selected UWB LAN by sending a responsive message to the LAN master and participating UWB ranging with anchors of the UWB LAN (508).

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for locating ultra-wide-band (UWB) devices, the system comprising:
    a plurality of UWB local area networks (LANs), including at least a first UWB LAN and a second UWB LAN, each UWB LAN comprising:
        a plurality of anchors configured for performing UWB ranging; and
        a LAN master anchor surrounded by at least some of the plurality of anchors, wherein the LAN master anchor is configured for transmitting a UWB beacon to identify the UWB LAN to one or more candidate tags to join the UWB LAN; and
    a tag securable to an object for tracking, wherein the tag is configured for:
        receiving a first UWB beacon from a first LAN master of the first UWB LAN;
        receiving a second UWB beacon from a second LAN master of the second UWB LAN; and
        determining to associate with the first UWB LAN based on the first UWB beacon and the second UWB beacon.

2. The system of claim 1, wherein the tag is configured for transmitting, in response to determining to associate with the first UWB LAN, a join message to the first LAN master, thereby causing a first plurality of anchors of the first UWB LAN to perform UWB ranging on the tag.

3. The system of claim 1, wherein each LAN master anchor is configured to transmit the UWB beacon at a scheduled time unique to the UWB LAN for the LAN master anchor.

4. The system of claim 1, wherein the first UWB LAN and the second UWB LAN are physically overlapping and the system comprises at least one overlapping anchor configured for participating in time-slotted UWB ranging in both the first UWB LAN and the second UWB LAN.

5. The system of claim 1, wherein the first UWB LAN and the second UWB LAN are physically separated and wherein the anchors of the first UWB LAN are configured for performing time-slotted UWB ranging in at least some of the same time windows as the anchors of the second UWB LAN.

6. The system of claim 1, wherein determining to associate with the first UWB LAN based on the first UWB beacon and the second UWB beacon comprises comparing a first signal strength of the first UWB beacon and a second signal strength of the second UWB beacon and determining to associate with the first UWB LAN in response to determining that the first signal strength is greater than the second signal strength.

7. The system of claim 1, wherein determining to associate with the first UWB LAN based on the first UWB beacon and the second UWB beacon comprises using message contents of the first UWB beacon and the second UWB beacon.

8. The system of claim 1, wherein the tag is configured for periodically receiving the first UWB beacon and the second UWB beacon and, at a later time when the tag has moved relative to the first UWB LAN master anchor and the second UWB LAN master, determining to re-associate with the second UWB LAN based on the first UWB beacon and the second UWB beacon.

9. The system of claim 1, wherein each anchor comprises at least one anchor processor, an anchor UWB radio, and an anchor timing system, and wherein the tag comprises at least one tag processor, a tag UWB radio, and a tag timing system, wherein the tag timing system and the anchor timing systems are time synchronized.

10. The system of claim 9, wherein the tag comprises a WiFi radio and the tag is configured for activating the WiFi radio after a specified amount of time has passed and the tag has not received a UWB beacon from any of the UWB LANs and sending a report to a gateway using the WiFi network.

11. A method for locating ultra-wide-band (UWB) devices, the method comprising:
    establishing a plurality of UWB local area networks (LANs), including at least a first UWB LAN and a second UWB LAN, each UWB LAN comprising:
        a plurality of anchors configured for performing UWB ranging; and
        a LAN master anchor surrounded by at least some of the plurality of anchors, wherein the LAN master anchor is configured for transmitting a UWB beacon to identify the UWB LAN to one or more candidate tags to join the UWB LAN; and
    associating, by a tag secured to an object for tracking, with one of the UWB LANS, wherein associating with one of the UWB LANs comprises:
        receiving a first UWB beacon from a first LAN master of the first UWB LAN;
        receiving a second UWB beacon from a second LAN master of the second UWB LAN; and
        determining to associate with the first UWB LAN based on the first UWB beacon and the second UWB beacon.

12. The method of claim 11, wherein associating with one of the UWB LANs comprises transmitting, in response to determining to associate with the first UWB LAN, a join message to the first LAN master, thereby causing a first plurality of anchors of the first UWB LAN to perform UWB ranging on the tag.

13. The method of claim 11, wherein each LAN master anchor is configured to transmit the UWB beacon at a scheduled time unique to the UWB LAN for the LAN master anchor.

14. The method of claim 11, wherein the first UWB LAN and the second UWB LAN are physically overlapping and the method comprises participating, by at least one overlapping anchor, in time-slotted UWB ranging in both the first UWB LAN and the second UWB LAN.

15. The method of claim 11, wherein the first UWB LAN and the second UWB LAN are physically separated and wherein the method comprises performing, by anchors of the first UWB LAN, time-slotted UWB ranging in at least some of the same time windows as the anchors of the second UWB LAN.

16. The method of claim 11, wherein determining to associate with the first UWB LAN based on the first UWB beacon and the second UWB beacon comprises comparing a first signal strength of the first UWB beacon and a second signal strength of the second UWB beacon and determining to associate with the first UWB LAN in response to determining that the first signal strength is greater than the second signal strength.

17. The method of claim 11, wherein determining to associate with the first UWB LAN based on the first UWB beacon and the second UWB beacon comprises using message contents of the first UWB beacon and the second UWB beacon.

18. The method of claim 11, comprising periodically receiving the first UWB beacon and the second UWB beacon and, at a later time when the tag has moved relative to the first UWB LAN master anchor and the second UWB LAN master, determining to re-associate with the second UWB LAN based on the first UWB beacon and the second UWB beacon.

19. The method of claim 11, wherein each anchor comprises at least one anchor processor, an anchor UWB radio, and an anchor timing system, and wherein the tag comprises at least one tag processor, a tag UWB radio, and a tag timing system, wherein the tag timing system and the anchor timing systems are time synchronized.

20. The method of claim 19, wherein the tag comprises a WiFi radio and the method comprises activating the WiFi radio after a specified amount of time has passed and the tag has not received a UWB beacon from any of the UWB LANs and sending a report to a gateway using the WiFi network.

* * * * *